United States Patent [19]
Bowen et al.

[11] Patent Number: 5,832,519
[45] Date of Patent: Nov. 3, 1998

[54] SYSTEM AND METHOD FOR UPDATING DATABASE VALUES WITHOUT THE USE OF LOCKING OPERATIONS

[75] Inventors: Thomas Floyd Bowen, Hopatcong; William Hill Mansfield, Pittstown, both of N.J.

[73] Assignee: Bell Communications Research, Inc., Morristown, N.J.

[21] Appl. No.: 171,266

[22] Filed: Dec. 21, 1993

Related U.S. Application Data

[63] Continuation of Ser. No. 630,577, Dec. 20, 1990, abandoned.

[51] Int. Cl.⁶ .................................................... G06F 17/30
[52] U.S. Cl. .......................... 707/203; 707/201; 395/712
[58] Field of Search ..................................... 395/600, 700, 395/300, 703, 712; 707/200, 201, 203

[56] References Cited

U.S. PATENT DOCUMENTS

| | | | |
|---|---|---|---|
| 4,558,413 | 12/1985 | Schmidt et al. | 395/600 |
| 4,631,673 | 12/1986 | Haas et al. | 364/300 |
| 4,809,170 | 2/1989 | Leblang et al. | 395/700 |
| 4,819,156 | 4/1989 | DeLorme et al. | 364/200 |
| 4,945,474 | 7/1990 | Elliot et al. | 364/200 |
| 5,050,075 | 9/1991 | Herman et al. | 395/600 |
| 5,230,073 | 7/1993 | Gausmann | 395/600 |

OTHER PUBLICATIONS

Katz, "Database Support for Versions and Alternatives of Large Design Files", IEEE 1984, pp. 191–200.
Marc J Rochkind, "The Source Code Control System" Dec.1975, pp.364–370, IEEE Transactions on Software Engineering Alan L Glasser, The Evolution of a Source Code Control System, 1978 pp. 122–125, Workshop—Software Engineering.

"Processing Hot Spots in High Performance Systems", D. Gawlick, Proceedings of Spring COMP CON '85—30th IEEE Computer Society International Conference 1985, pp. 249–251.

"Concurrency on High Traffic Data Elements", A. Reuter, ACM Symposium on Principles of Data Base Systems, Mar. 1982, pp. 83–92.

*Primary Examiner*—Paul Kulik
*Attorney, Agent, or Firm*—Joseph Giordano; David A. Hey; Loria B. Yeadon

[57] ABSTRACT

A data processing system (10) comprising a general purpose computer (20) for carrying out database processing operations. An aggregation system (30) is in communication with the general purpose computer (20). The aggregation system (30) includes a memory (32) for storing, for each of a plurality of data values, a base value and one or more incremental updates. An aggregation processor (34) forming part of the aggregation system (30) receives the incremental updates from the general purpose computer (20), writes the incremental updates into the memory (32), and controls the aggregation of base values and incremental updates stored in said memory (32) to read the data values. In this manner data values are updated and read without the use of locking operations.

10 Claims, 2 Drawing Sheets

BASE RELATION

| VALUE IDENTIFIER (i) | BASE VALUE ($base_i$) | TIMESTAMP $t_i$ |
|---|---|---|
| 1 | $base_1$ | $t_1$ |
| 2 | $base_2$ | $t_2$ |
| 3 | $base_3$ | $t_3$ |
| 4 | $base_4$ | $t_4$ |
| 5 | $base_5$ | $t_5$ |
| 6 | $base_6$ | $t_6$ |

LOG RELATION

| VALUE IDENTIFICATION (i) | DELTA VALUE ($\delta_{ij}$) | TIMESTAMP ($t_{ij}$) |
|---|---|---|
| 1 | $\delta_{11}$ | $t_{11}$ |
| 1 | $\delta_{12}$ | $t_{12}$ |
| 3 | $\delta_{31}$ | $t_{31}$ |
| 1 | $\delta_{13}$ | $t_{13}$ |
| 2 | $\delta_{21}$ | $t_{21}$ |
| 3 | $\delta_{32}$ | $t_{32}$ |
| 2 | $\delta_{22}$ | $t_{22}$ |
| 3 | $\delta_{33}$ | $t_{33}$ |
| 4 | $\delta_{41}$ | $t_{41}$ |
| 5 | $\delta_{51}$ | $t_{51}$ |

FIG. 3

BASE RELATION

| VALUE IDENTIFIER (i) | BASE VALUE ($base_i$) | TIMESTAMP $t_i$ |
|---|---|---|
| 1 | $base_1$ | $t_1$ |
| 2 | $base_2$ | $t_2$ |
| 3 | $base_3$ | $t_3$ |
| 4 | $base_4$ | $t_4$ |
| 5 | $base_5$ | $t_5$ |
| 6 | $base_6$ | $t_6$ |

FIG. 4

LOG RELATION

| VALUE IDENTIFICATION (i) | DELTA VALUE ($\delta_{ij}$) | TIMESTAMP ($t_{ij}$) |
|---|---|---|
| 1 | $\delta_{11}$ | $t_{11}$ |
| 1 | $\delta_{12}$ | $t_{12}$ |
| 3 | $\delta_{31}$ | $t_{31}$ |
| 1 | $\delta_{13}$ | $t_{13}$ |
| 2 | $\delta_{21}$ | $t_{21}$ |
| 3 | $\delta_{32}$ | $t_{32}$ |
| 2 | $\delta_{22}$ | $t_{22}$ |
| 3 | $\delta_{33}$ | $t_{33}$ |
| 4 | $\delta_{41}$ | $t_{41}$ |
| 5 | $\delta_{51}$ | $t_{51}$ |

SYSTEM AND METHOD FOR UPDATING DATABASE VALUES WITHOUT THE USE OF LOCKING OPERATIONS

This is a continuation of application Ser. No. 07/630,557 filed Dec. 20, 1990 now abandoned.

RELATED APPLICATIONS

The following U.S. patent-applications are assigned to the assignee hereof and contain subject matter related to the subject matter of the present application:

1. U.S. patent application Ser. No. 07/363,298 entitled "Architecture For A Storage Access System For High Performance Computer Systems" filed for E. J. Gausman, K. S. Grewal, and G. E. Herman on Jun. 6, 1989, now U.S. Pat. No. 5,230,073 issued Jul. 20, 1993, which is a continuation of U.S. application Ser. No. 06/888,733 filed on Jul. 21, 1986, now abandoned; and 2. U.S. patent application Ser. No. 07/253,240, entitled "A High Performance VLSI Data Filter" filed for Gary Herman, K. C. Lee, and Takako Matoba on Oct. 4, 1988 now U.S. Pat. No. 5,050,075, issued Sep. 17, 1991.

3. U.S. patent application Ser. No. 07/630,556 now U.S. Pat. No. 5,263,156, issued Nov. 16, 1993, entitled "Optimistic Concurrency Control Certification Using Hardware Filtering" filed for William H. Mansfield and Thomas F. Bowen on even date herewith.

The contents of the above-identified related applications are incorporated herein by reference.

FIELD OF THE INVENTION

The present invention relates to processing of database transactions and specifically to a system and method for reading and updating data values.

BACKGROUND OF THE INVENTION

A database is defined as a collection of data values, organized according to a data model and accessed by carrying out a transaction which comprises one or more database operations. While the inventive system and method applies to a variety of data models, the invention is best illustrated using a relational database model.

In a relational database, which is also known as a relation, data is organized in columns. Each column comprises one attribute of the relation. Each column or attribute of a relation has a domain which comprises the data values in that column. One row of a relation which comprises one value from each attribute is known as a tuple or a record.

Numeric data is stored in a database as integer values or floating point numbers. A series of updates of a numeric data item are commutative if the order of application of updates does not alter the final result. That is $$A+B+C+D = A+D+C+B$$

To access a relational database, a select operation may be utilized. In the case of a relational database, a select operation generally refers to selecting those tuples of a relation R whose attribute A is equal to a specified constant C. This select operation is denoted $R.A=C$ or $S_{R.A=C}$. Operators other than equal such as "greater than", "less than" or "not equal" are allowed, as are combinations of operations including AND and OR operations to build up complex selections.

A transaction is defined as a program that includes database operations such as the above-described select operation. If the database operations in a transaction only retrieve data, the transaction is called a read-only transaction. The collection of tuples obtained by applying a select operation against a database is known as a transaction read-set. The set of tuples which is modified, added, or deleted in a transaction is known as a transaction write-set. A transaction is an atomic unit of work that is either completed in its entirety or not done at all. A begin operation marks the beginning of transaction execution. An end operation marks the end-execution point in the transaction and indicates that database changes (if any) are ready for permanent application to the database. A commit operation propagates a transaction write-set to the database. A correct execution of a transaction must take the database from one consistent state to another.

Concurrency control is a mechanism that guarantees that the database state is always consistent. It also guarantees that an atomic transaction receives data from and applies data to a consistent database from the transaction's perspective. There are several techniques, for performing concurrency control operations including locking, time-stamp ordering, multiversion and optimistic schemes.

When a locking scheme is used for concurrency control, a specific transaction involving certain tuples or records locks these records against access by other transactions until the specific transaction is completed by propagating the specific transaction's write-set into the database. In this manner, it is insured that the specific transaction takes the database from one consistent state to another consistent state, as no other transaction can gain access to the locked records while the specific transaction is performed. However, a shortcoming of the locking scheme is that there are serialization delays as transactions queue up to gain access to certain records. Such serialization delays are especially severe when certain records are "hot-spots", i.e., records which are utilized very frequently in transactions. Standard locking methods for concurrency control require the locking of records from the time of the first read operation of a transaction until the commit operation for changes in the database is complete.

Prior work as referenced below has been done to try to reduce the time that locks are held for individual records or other data items during a transaction. This prior work relates to aggregate records. Aggregate records are records which are semantically dependent on other records in the database. Therefore, aggregate data records are read and written more frequently than other records because they are modified every time one of their dependent records is modified. The prior art techniques for reducing locking time take advantage of the fact that most applications need to first read the aggregate record to verify that a particular data value in the record is within a specific range, and then if so, to modify the particular data value in the aggregate record.

In IBM's Fast Path Method (see, e.g., D. Gawlick "Processing Hot Spots in High Performance Systems", Proceedings of Spring COMP CON '85 - 30th IEEE Computer Society International Conference 1985) two special primitives are provided, verify and modify. Transactions verify a particular data value in an aggregate record by issuing verify operations which specify an aggregate record and a predetermined range for the particular data value as arguments. Transactions change a particular data value in an aggregate record by issuing modify operations which specify a particular data value in an aggregate record to be modified and a delta function. The delta function describes a change in the particular data value that can be applied atomically.

Verifies and modifies are saved in a work to do list. When a transaction commits, its work to do list is processed.

During the first phase of commit processing, records accessed by verifies and modifies in the work to do list are locked. For each verify, a particular data value in an aggregate record is read and compared to the range contained in the argument of the verify operation. If the particular data value in the aggregate record is within the range, the verify succeeds, otherwise it fails. Any transaction having a failing verify is aborted. If all verifies succeed, the transaction moves to the second commit phase in which the modifies are applied to aggregate records in the database. After all the modifies are completed the accessed records are unlocked.

The above described Fast Path concurrency control method for aggregate records is an improvement over the standard concurrency control method used for non-aggregate records in that the period for which locks are held is shortened. As indicated above, standard methods require the locking of records from the time of the first read operation until the end of the commit operation. The Fast Path concurrency control method described above requires locking only during commit operations, which as indicated above comprise verify and modify operations. Shortening the locking duration improves concurrency control performance because other concurrent transactions needing to access the same aggregate records are less likely to have to wait for them to be unlocked.

An alternative technique for shortening the locking time of aggregate records is known as Reuter's Method (see A. Reuter "Concurrency on High Traffic Data Elements" ACM Symposium on Principles of Data Base Systems, March 1982). Whereas the Fast Path method does not make use of the verify and modify operations until commit time, Reuter's method makes use of verify and modify operations when they are issued. In accordance with Reuter's method, for each aggregate record in the database, the database management system stores two values to indicate the possible high and low values a particular data value in an aggregate record could obtain. The high and low values are based on all possible combinations of successes or failures of the current uncommitted transactions which have issued modifies on the aggregate record.

Consider the case where a new transaction comes along and issues a verify on a specific aggregate record. The previously stored high and low values for the specific aggregate record are used to determine whether or not a particular data value in the specific aggregate record falls within the acceptable range contained in the argument of the verify operation issued by the new transaction. If the particular data value of the specific record is not within the acceptable range as indicated by the high and low values, the new transaction can abort immediately, rather than waiting until commit time, thereby avoiding unproductive work. If the particular data value of the specific aggregate record is acceptable to the verify issued by the new transaction, the new transaction can continue. Thus, the new transaction issues a modify and the database management system checks to see if accepting the modification would change the high and low value of the specific aggregate record in such a way that the result of a verify operation of a previous transaction which is not yet committed would change from true to false. If so, the modification proposed by the new transaction is rejected and the new transaction can abort immediately. Otherwise, the new transaction can continue and the aggregate record to be modified is locked. The foregoing combination of verify and modify actions insures that transactions whose verify or modify operations fail can abort early, thus avoiding the unnecessary locking of aggregate records.

Both the Fast Path technique and the Reuter's technique discussed above reduce the locking time of records but do not eliminate locking.

In view of the foregoing, it is an object of the present invention to provide a system and method for avoiding locking altogether while allowing concurrent updates to and reads of aggregate records or other aggregate data items such as numeric summary data items.

SUMMARY OF THE INVENTION

The present invention relates to a system and method for maintaining the consistency of data values such as aggregate numeric data values while allowing concurrent updates without the use of locking operations. To avoid database locking operations, an update of a data value in a database is transformed from an update operation that changes a unique value in the database to a logging operation that records incremental changes in a data value. A database read operation is correspondingly transformed from a read of a single value, to a selection of a base value and the aggregation of all the incremental changes in the log associated with the selected base value. Since logging operations avoid the locking of the database records for extended periods of time, processing serialization delays caused by lock contention during updates are avoided and greater levels of concurrency are achieved.

In accordance with an illustrative embodiment of the invention, a data processing system comprises a general purpose computer including a database management system for executing transactions on a database. Associated with the general purpose computer is an aggregation system. The aggregation system enables the general purpose computer to update and read certain data values such as numeric summary data values which are updated frequently (i.e. hotspot data values) with minimal or no use of locking operations.

The aggregation system comprises memory means which stores two relations. The first relation comprises for each of a plurality of data values a base value and a time-stamp indicating when the base value was computed. The second relation is a log of the incremental updates to the base values in the first relation. Thus, for each data value, the second relation comprises one or more incremental updates and a time-stamp for each incremental update.

The aggregation system also comprises a processor. The processor is in communication with the general purpose computer. The aggregation system processor performs update operations by receiving the incremental updates from the general purpose computer and writing them into the log relation maintained in the memory means.

The aggregation system processor also receives requests to read data values from the general purpose computer and returns the read data values to the general purpose computer. To read a data value such as a numeric summary data value, the aggregation system includes selection means for selecting from the first relation a base value and for selecting from the second relation the incremental updates associated with the base value. The incremental updates which are selected have a time-stamp which is later than the time-stamp of the selected base value. The read operation then involves aggregating the selected base value and incremental updates. The aggregated value is then returned to the computer to respond to the read request. In addition, periodically the base values in the first relation stored in the aggregation system memory means are updated by aggregating the base values with the associated incremental updates to form new base values. A new base value and a time-stamp replace a corresponding old base value and its time-stamp in the first relation. Incremental updates incorporated into new base values may be deleted from the log operation at any time as the use of time-stamps prevents these incremental updates from impacting subsequent aggregation operations.

In an illustrative embodiment of the invention, the selection means comprises a transmitter for cyclically broadcasting the first and second relations in the form of a bit stream over a communication channel and a filter subsystem for selecting from the broadcast bit stream the base value and appropriate incremental updates.

The selected base value and incremental updates are aggregated either locally at the filter subsystem or by the aggregation system processor and then transmitted to the general purpose computer. As indicated above, the aggregation system memory may also be updated by substituting for the original base value a new base value which is equal to the recently computed aggregate value and by deleting all of the incremental updates included in the new base value.

Through use of the aggregation system described above, a data value is updated and read in a consistent fashion without the use of locking operations.

BRIEF DESCRIPTION OF THE DRAWING

FIG. 3 and FIG. 4 illustrate relations utilized by the aggregation system of FIG. 1 to perform database updates.

DETAILED DESCRIPTION OF THE INVENTION

Figure 1:
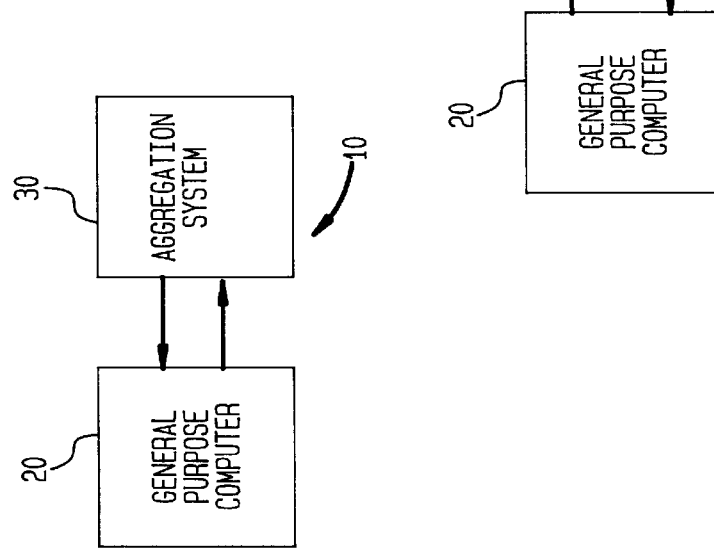
FIG. 1 schematically illustrates a data processing system including an aggregation system for performing database updates and reads without locking operations in accordance with the present invention.

A database transaction processing system 10 which performs a variety of database transactions including consistently updating and reading data values such as aggregate numeric data values is schematically illustrated in FIG. 1. The transaction processing system 10 comprises a general purpose computer 20 for executing database transactions including database read and write operations. The general purpose computer 20 is in communication with the aggregation system 30 which performs updates and reads of data values using aggregation techniques in accordance with the present invention. In particular, the aggregation system 30 consistently performs updates and reads of summary numeric data values without the use of locking operations. To perform data value update operations, the aggregation system 30 receives and stores incremental updates of data values from the general purpose computer 20. The incremental updates represent incremental changes in the data values. Therefore, to compute the current value of a numeric summary value, incremental updates associated with the numeric summary value and having a time stamp later than the time-stamp of the base value associated with the numeric summary value are aggregated with the base value. The aggregate system 30 also aggregates incremental updates for various data values to read these data values in response to read requests from the general purpose computer 20. In other words, the aggregation system arithmetically sums the incremental updates having a time-stamp which is later than the time-stamp of the selected base value with the selected base value to generate an aggregated value in response to the read request.

Figure 2:
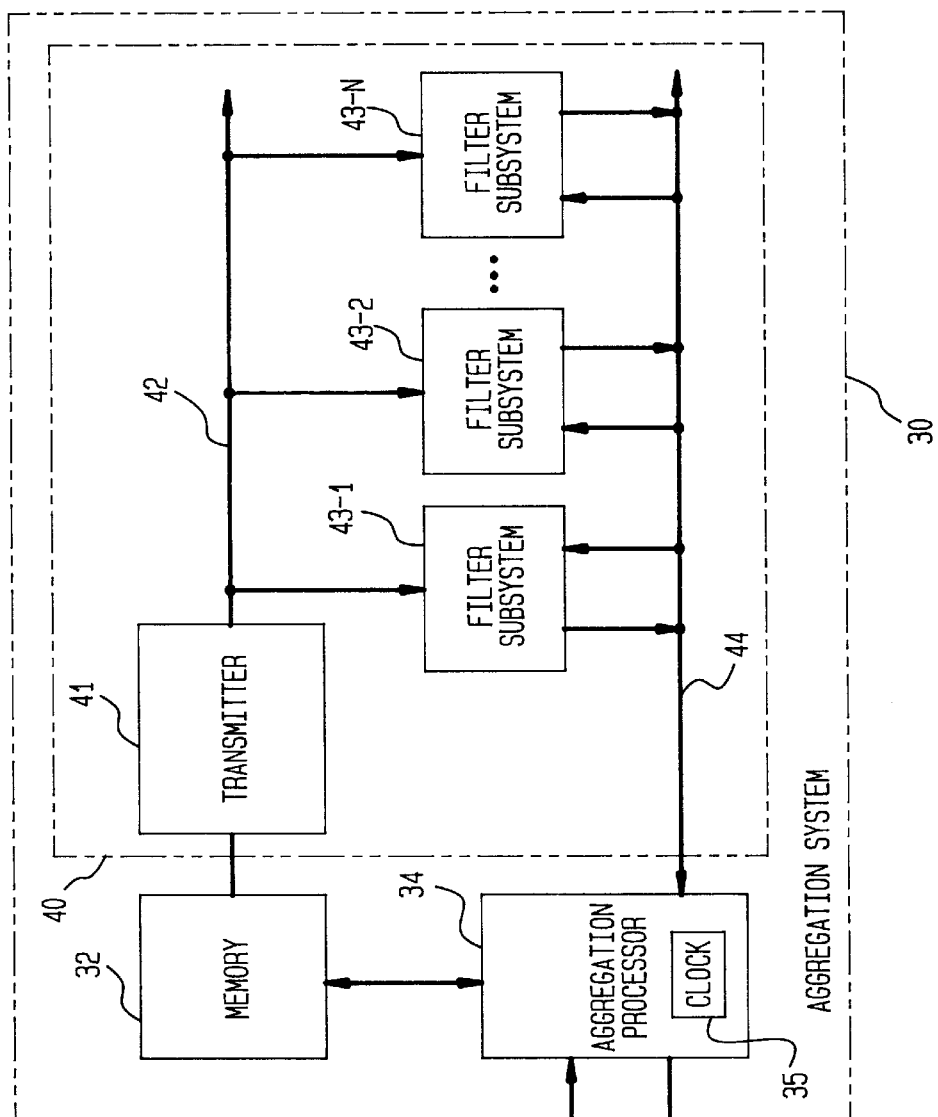
FIG. 2 illustrates one embodiment of an aggregation system for use in the data processing system of FIG. 1.

FIG. 2 illustrates the aggregation system 30 in greater detail. As shown in FIG. 2, the aggregation system 30 comprises a memory 32, a processor 34, and a selection system 40.

A numeric data value $N_i$ which is consistently maintained by the aggregation system 30 is split into a static base value $base_i$ and a series of incremental updates $\delta_{ij}$. The base value $base_i$ is associated with a time-stamp $t_i$ which is the time at which the base value was computed. A time-stamp $t_{ij}$ is also associated with each incremental update $\delta_{ij}$ which indicates when the incremental update $\delta_{ij}$ was received in the aggregation system 30 from the general purpose computer 20 and logged in the memory 32. Illustratively, the time-stamps $t_i$ and $t_{ij}$ are computed by a clock 35 associated with the processor 34.

Thus, a numeric data value $N_i$ may be represented as $$N_i = base_i + \Sigma \delta_{ij}$$

where the $\delta_{ij}$ represent all increments associated with $N_i$ since the time $t_i$ that $base_i$ was computed.

In a relational database implementation of the present invention, two relations are stored in the memory 32 of the aggregation system 30. The first relation is a base relation which stores the base values $base_i$ of the data values $N_i$ and the associated time-stamps $t_i$. The second relation is a log relation which stores the incremental updates $\delta_{ij}$ and the associated time-stamps $t_{ij}$.

FIG. 3 schematically illustrates the base relation stored in the memory 32. This base relation includes three attributes: value identification (i), base value ($base_i$) and time-stamp ($t_i$).

FIG. 4 schematically illustrates the log relations stored in the memory 32. This relation includes three attributes: item identification (i), delta value ($\delta_{ij}$) and time-stamp ($t_{ij}$).

To read a numeric data value $N_i$, the following algorithm may be utilized.

1. select the base value $base_i$ and the time-stamp $t_i$ from the base relation;
2. select from the log relation the increments $\delta_{ij}$ having a time-stamp $t_{ij}$ which is later than $t_i$; and
3. compute $N_i = base_i + \Sigma \delta_{ij}$.

Thus, to read a data value such as $N_3$ the base value $base_3$ is selected from the base relation of FIG. 3 and the incremental updates $\delta_{31}$, $\delta_{32}$ and $\delta_{33}$ are selected from the log relation of FIG. 4 assuming that the time-stamps $t_{31}$, $t_{32}$ and $t_{33}$ of the incremental updates are later than the time-stamp $t_3$ of the base value.

Typically, a value $N_i$ is computed in response to a request received at the aggregation system processor 34 from the general purpose computer 20. Thus, once $N_i$ is computed it is returned to the general purpose computer 20 from the aggregation system processor 34. In addition, periodically the original value $base_i$ and time-stamp $t_i$ in the memory 32 is replaced by the computed value $N_i$ which becomes a new base value and a new time-stamp $t_i$. All increments $\delta_{ij}$ aggregated into the new base value may be deleted from the log relation. The periodic updates of the base values may or may not be in response to a request issued by the general purpose computer 20.

The aggregation system 30 of FIG. 2 may be utilized to carry out the above-described aggregation algorithm as follows. The selection system 40 of the aggregation system 30 makes use of a unique memory access system for gaining access to the log and base relations stored in the memory 32. This memory access system is described in detail in the above-identified U.S. patent application Ser. No. 07/363, 298, now U.S. Pat. No. 5,230,073 issued Jul. 20, 1993. In particular, the contents of the base and log relations stored in the memory 32 are cyclically broadcast by the transmitter unit 41 over the downstream communications channel 42. Located along the channel 42 are a plurality of filter subsystems 43-1, 43-2, . . . , 43-N. The filter subsystems 43 serve as "listening processors". Specifically, the filter subsystems listen to the bit stream broadcast via the channel 42 and filter out certain selected information in response to instructions received from the aggregation processor 34. One embodiment of a filter subsystem 43 is disclosed in the above-identified U.S. patent application Ser. No. 07/363, 298, now U.S. Pat. No. 5,230,073 issued Jul. 20, 1993. A higher speed embodiment of a filter subsystem is disclosed in the above-identified U.S. patent application Ser. No. 07/253,240, now U.S. Pat. No. 5,050,075 issued Sep. 17, 1991. Generally, each filter subsystem 43 comprises a high speed comparator as well as some local processing capability.

To execute a read request, the aggregation processor 34 transmits via the channel 44 to one of the filter subsystems 43 instructions to select from the cyclically broadcast data stream a certain base value $base_i$ and corresponding incremental updates $\delta_{ij}$. In response to these instructions, the filter subsystem 43 selects the appropriate data values from the broadcast data stream. For example, to retrieve the tuple containing a base value $base_i$ from the base relation, an instruction containing the value identification i is sent to a specific filter subsystem 43. The specific filter system 43 then performs a select operation by comparing the value identification i with all of the tuples in the base relation as they are broadcast over the channel 42 to pick out the tuple containing the value identification i and thus retrieve $base_i$ and its associated time-stamp $t_i$. Similarly, to retrieve the incremental updates $\delta_{ij}$ from the log relation, the filter system 43 looks at the broadcast bit stream to select tuples having the value identification i and a time-stamp $t_{ij}$ which is later than $t_i$. The updated data value $N_i$ may be computed locally at a filter subsystem 43, in which case $N_i$ is transmitted back to the aggregation processor 34 via channel 44. Alternatively, the selected base value and incremental updates are transmitted back to the aggregation processor 34 for aggregation. Once $N_i$ is computed, it is sent to the general purpose computer 20. In addition, periodically, the base values in the base relation are updated and the incremental updates incorporated into the updated base values are removed from the log relation.

Finally, the above-described embodiments of the invention are intended to be illustrative only. Numerous alternative embodiments may be devised by those skilled in the art without departing from the spirit and scope of the following claims.

We claim:

1. A method of using an aggregation system, having memory means for storing a plurality of data values, to read data values and to perform concurrent updates of data values such that access to each data value for reading and concurrently updating each data value is maintained, the method comprising the steps of storing in the memory means a first relation comprising, for each of a plurality of numeric data values, a base value and a time-stamp indicating when the base value was computed, storing in the memory means a second relation comprising, for each of said numeric data values, one or more incremental updates and a time-stamp for each incremental update, reading a specific numeric data value by electronically retrieving from the first relation in the memory means a base value of said specific numeric data value, electronically retrieving from the second relation in the memory means incremental updates associated with the specific numeric data value having a time-stamp which is later than the time-stamp of said base value of said specific numeric data value, and utilizing electronic processing means to aggregate the retrieved base value and incremental updates, and performing concurrent updates of said specific numeric data value by receiving at said processing means other incremental updates associated with said specific numeric data value from a computer which processes database transactions, and writing said other incremental updates into said second relation in the memory means.

2. The method of claim 1 wherein said retrieving steps comprise cyclically broadcasting from said memory means said first and second relations in the form of a bit stream, and utilizing an electronic filter to select from said bit stream said base value of said specific numeric data value and said incremental updates associated with said specific numeric data value.

3. The method of claim 1 wherein said method further comprises the step of transmitting said read data value to said computer.

4. The method of using an aggregation system of claim 1 wherein said step of reading said specific data value is executed concurrently with said step of performing concurrent updates of said specific numeric data value.

5. A method of using an aggregation system, having memory means for storing a plurality of data values, to process data values held in the memory means such that access to each data value for reading and performing concurrent updates of each data value is maintained, the method comprising the steps of:

storing base values of a plurality of data values in the memory means, performing concurrent updates of each data value by receiving at an electronic processing means in communication with the memory means incremental updates for each of said data values from a computer for carrying out database transactions, and writing said incremental updates of said data value into the memory means, reading said data values by utilizing said electronic processing means in response to said computer to aggregate the base values and associated incremental updates, and transmitting said read data values to said computer, and updating the base values by writing the aggregations of the base values and associated incremental updates into the memory means.

6. The method of claim 5 wherein said method further comprises the step of, when the base value of a data value is updated, removing from said memory means the corresponding incremental updates which are incorporated into the updated base value.

7. A method of using an aggregation system, having memory means for storing a plurality of summary data values, to process the summary data values such that access to each summary data value for reading and performing concurrent updates of each summary data value is maintained, the method comprising the steps of:

performing concurrent updates of each summary data value by
        storing the base value of each summary data value in the memory means,
        receiving at electronic processing means in communication with the memory means incremental updates for each summary data value, and
        storing in the memory means a log of said incremental updates and
    reading each of the summary data values by
        selecting from the memory means a base value and one or more incremental updates corresponding to each summary data value to be read and
        utilizing said electronic processing means to aggregate the selected base value and one or more incremental updates.

8. A method of using an aggregation system, having memory means for storing a plurality of data values, to read and perform concurrent updates of data values such that access to each data value for reading and concurrently updating each data value is maintained wherein the memory means includes a first relation for storing, for each data value, a base value and a time-stamp indicating when the base value was computed and a second relation for storing, for each data value, at least one incremental update and a time-stamp for each incremental update and wherein the system further includes processing means for receiving base values and incremental updates, the method comprising the steps of reading each data value by
        electronically retrieving from the first relation in the memory means a base value corresponding to the data value,
        electronically retrieving from the second relation in the memory means the incremental updates corresponding to the data value, which updates have a time-stamp which is later than the time-stamp of the base value of the data value, and
        aggregating, using the electronic processing means, the retrieved base value and incremental updates to form the data value and,
    performing concurrent updates of each data value by
        receiving at the processing means incremental updates corresponding to the data value and
        logging the received incremental updates into the second relation of the memory means.

9. A method of using an aggregation system, having memory means for storing a plurality of data values, to read data values and to perform concurrent updates of each data value such that consistency of each data value in the memory means and access to each data value for reading and concurrently updating each data value are maintained, the method comprising the steps of maintaining consistency of data values by
        storing in the memory means a first relation comprising, for each of a plurality of numeric data values, a base value and a time-stamp indicating when the base value was computed, and
        storing in the memory means a second relation comprising, for each of said numeric data values, one or more incremental updates and a time-stamp for each incremental update,
    reading a specific numeric data value by
        electronically retrieving from the first relation in the memory means a base value of the specific numeric data value to be read for use in a specific transaction,
        electronically retrieving from the second relation in memory means incremental updates associated with the specific numeric data value having a time-stamp which is later than the time-stamp of said base value of said specific numeric data value, and
        utilizing electronic processing means to aggregate the retrieved base value and incremental updates to read the specific numeric data value, and
    performing concurrent updates of the specific numeric data value by
        receiving at said processing means other incremental updates associated with the specific numeric data value from a computer which processes database transactions, and
        writing said other incremental updates into said second relation in the memory means concurrent with said steps of retrieving from the first relation and retrieving from the second relation.

10. A method of using an aggregation system, having memory means for storing a plurality of data values, to perform concurrent updates of each data value such that access to each data value for performing concurrent updates of each data value is maintained, wherein the memory means includes a first relation for storing, for each data value, a base value and a time-stamp indicating when the base value was computed and a second relation for storing, for each data value, at least one incremental update and a time-stamp for each incremental update and wherein the system further includes processing means for receiving base values and incremental updates, the method comprising the steps of performing concurrent updates of each data value by
        receiving at the processing means incremental updates corresponding to each data value and
        logging the received incremental updates into the second relation of the memory means.

\* \* \* \* \*